United States Patent [19]

Salutati

[11] 3,710,132
[45] Jan. 9, 1973

[54] TIME CENTERING APPARATUS FOR RAILROAD INSTALLATIONS AND OTHER USES

[75] Inventor: Giovanni Salutati, Firenze, Italy

[22] Filed: Sept. 3, 1971

[21] Appl. No.: 177,706

[30] Foreign Application Priority Data

Sept. 5, 1970 Italy....................................9652 A/70

[52] U.S. Cl............................307/43, 58/24 R, 58/33
[51] Int. Cl. .............................................G04c 11/04
[58] Field of Search ..................307/43, 149; 317/23; 340/309.1, 309.4, 309.5, 47; 58/24, 33; 246/108, 1

[56] References Cited

UNITED STATES PATENTS

| 3,469,390 | 9/1969 | Zimmer | 58/34 |
| 3,520,128 | 7/1970 | Norikov et al | 58/33 |
| 3,541,522 | 11/1970 | Carlson | 58/24 R X |
| 3,643,420 | 2/1972 | Haydon | 58/24 R X |

Primary Examiner—Robert K. Schaefer
Assistant Examiner—William J. Smith
Attorney—John J. McGlew et al.

[57] ABSTRACT

A time centralizing apparatus, such as used in railroad installations, includes a line section having a plurality of stations each having a repeated panel. A pilot generator at one end of the line section transmits synchronizing electric pulses to the station nearest thereto, with the repeater panel of each station being adapted to synchronize clocks or other local servo devices and to transmit, to the next succeeding station, the sequence of pulses received thereby. A second or auxiliary generator at the opposite end of the line section is operable, responsive to non-arrival of pulses from the pilot generator, to transmit synchronizing electric pulses in the opposite direction along the line station to synchronize the cutoff stations. A respective reversing relay at each repeater panel normally conditions the associated panel to receipt of pulses from the pilot generator, and respective means at each repeater panel is operable, responsive to non-arrival of pulses from the pilot generator, to operate the reversing relay to condition the associated repeater panel to receipt of pulses from the second or auxiliary generator. A first time-responsive micro-relay at each station is maintained energized by a condenser which is charged by pulses received from the pilot generator. A second time-responsive micro-relay is provided and maintained energized by a condenser which is charged by pulses received from the second or auxiliary generator, and thus is normally deenergized. Upon non-arrival of pulses from the pilot generator, the condensor of the first relay looses its charge and the relay is deenergized to close an energizing circuit for the operating coil of the reversing relay, this energizing circuit being closed through a contact of the second relay. The reversing relay is thus operated. Upon restoration of pulses from the pilot generator, the auxiliary generator causes to transmit pulses. This results in discharge of the condensor associated with the second micro-relay, so that this second micro-relay is deenergized and opens the energizing circuit for the reversing relay. The latter thus is restored to a "normal" position in which it cuts off receipt of pulses from the second or auxiliary generator, and the first relay is energized, by charging of its condenser by pulses from the pilot generator, to open its contact included in the energizing circuit for the operating winding or coil of the reversing relay. A feature of the invention is that each station has its own local source of potential which is preferably supplied from a battery charged through a rectifier from the usual lighting circuit.

8 Claims, 1 Drawing Figure

United States Patent [19]
Salutati
[11] 3,710,132
[45] Jan. 9, 1973
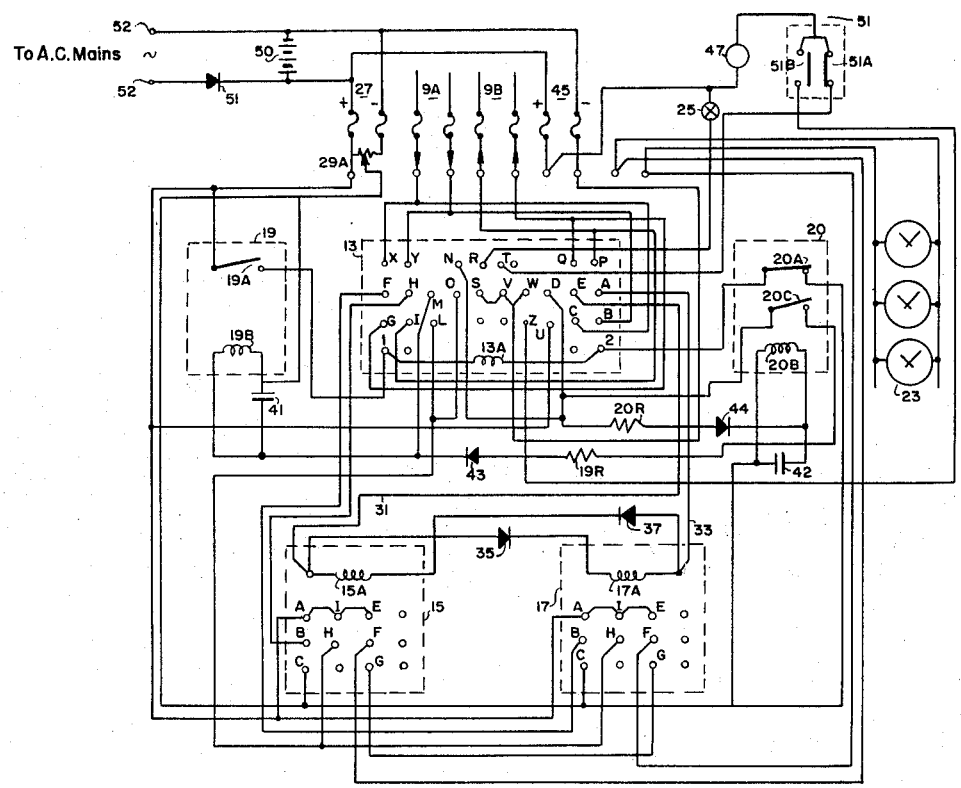

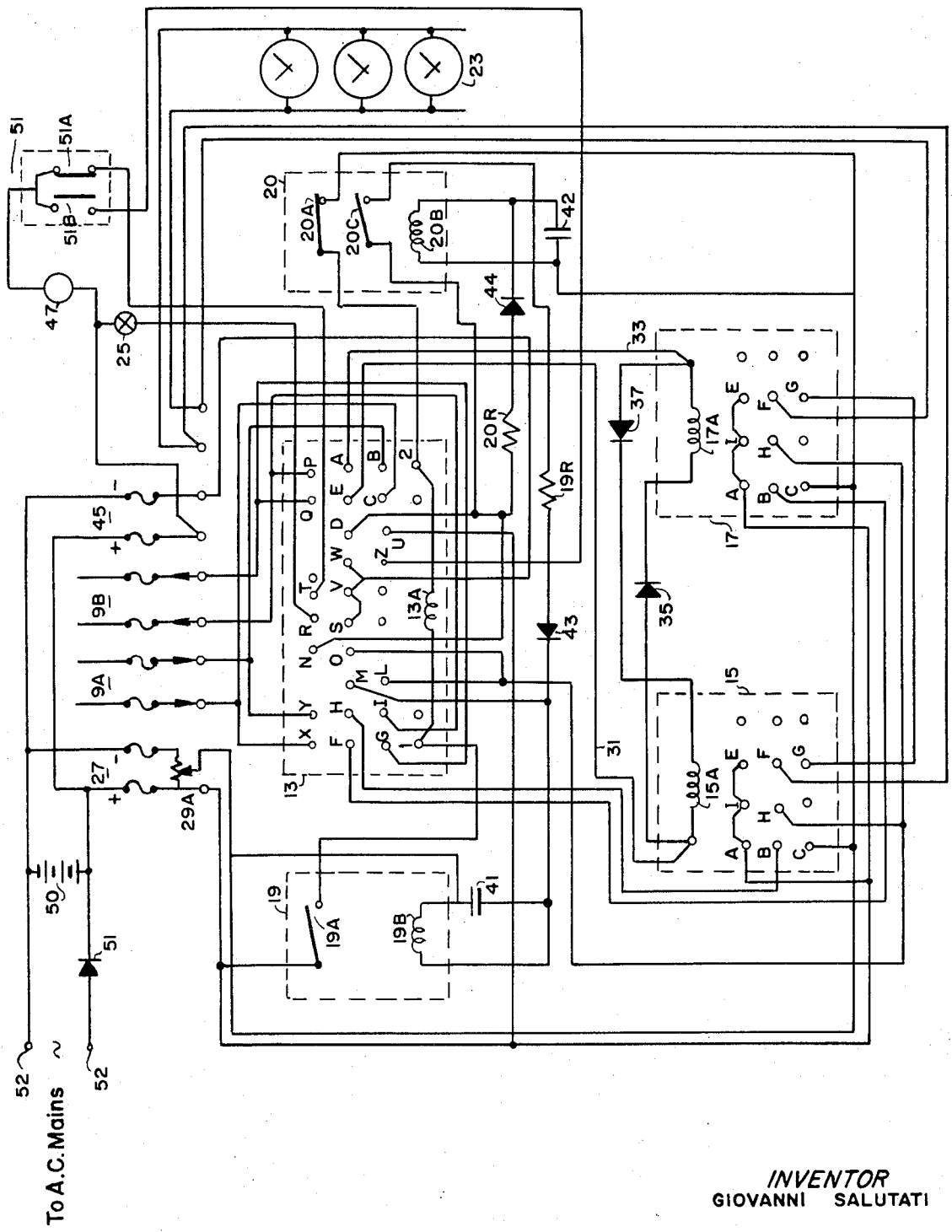

TIME CENTERING APPARATUS FOR RAILROAD INSTALLATIONS AND OTHER USES

BACKGROUND OF THE INVENTION

It is known from Italian Pat. No. 837,716 that the technical problem inherent in the centralization of time in railroad installations, or for other uses, can be solved with the aid of an apparatus consisting substantially of a line section comprising a plurality of stations or block posts. In each station, there is installed a repeater panel adopted to synchronize clocks or other local servo devices, and also adopted to repeat, toward the stations down the line, the sequence of electric synchronizing pulses transmitted by a pilot generator disposed at one end of the line section.

In this apparatus, means are provided so that no interruption of the transmission of pulses along the entire section, from the departure station to the end station, will occur. For this purpose, in addition to the main or pilot generator, a second or auxiliary generator is provided in the station at the opposite end of the line section. When there is any failure or interruption along the section, this second generator intervenes to synchronize the cut-off stations by sending synchronizing pulses in the opposite direction along the line section.

The presetting of each individual repeater panel to one or the other of the mentioned conditions, namely to the utilization of pulses coming from the main or pilot generator, which is the normal condition, or to the utilization of pulses coming from the auxiliary or second generator, which is the emergency condition, is effected by means of a reversing relay having two positions, each repeater panel being provided with a respective such reversing relay.

The control of each reversing relay is effected by a time relay operable to switch the reversing relay from the normal position to the emergency position, in the case of the absence of signals coming from the main or pilot generator. The same time relay is operable to switch the reversing relay to restore the normal conditions of the apparatus. In this latter case, however, its action is preset by a micro-relay which in turn is controlled by means of a remotely controlled code receiver with signals sent over a service line, such as a telephone pair, extending parallel to the line used for the transmission of the time synchronizing pulses.

Of the several solutions to the problem which have been adopted, the one involving the restoration of the system to conditions of normal operation has clear limits of economic suitability and of reliability. The main disadvantage resides in the fact that the use of a second telephone pair is required, the cost of which is high, to remotely control the restoring micro-relays located in each station repeater panel.

Additionally, the actuation of each of these micro-relays by its own selective receiving element, adapted to discern the preselected combination of code signals, would appear to be the section of the installation which has the most critical operation. The proposed use of selector relays does not provide sufficient reliability, mainly because of the difficult different calibrations to which they must be subjected. It must be noted that non-excitation of even a single restoring micro-relay is sufficient to imperil the restoration in all installations down the line therefrom.

FIELD OF THE INVENTION

This invention relates to time centralizing apparatus, such as used in railroad installations, and, more particularly, to a novel and improved arrangement for restoring individual stations, along a line section, from a reverse feed condition to a normal feed condition, with respect to receipt of synchronizing pulses from either a pilot generator, at one end of the line section, or an auxiliary generator, at the opposite end of the line section.

SUMMARY OF THE INVENTION

In accordance with the present invention, the device for restoring normal conditions of the installation is changed by eliminating the necessity for the use of a telephone pair, by simplification of the circuitry of the repeat panel at each station, and by increasing the reliability of operation of the entire system.

The solution adopted in accordance with the invention comprises the provision, in each repeating panel including the remote control device and the restoring micro-relay, of a second time relay operable to effect switching of the reversing relay from the emergency position to the normal position. The intervention of the second time relay is conditioned by the arrival or absence of the time pulses coming, under reversal conditions, from the secondary or auxiliary generator. The excitation of this additional time relay initiates a switching sequence of the other relays contained in the panel, at the end of which sequence the entire device is able to receive the pulses from the main pilot generator.

The interruption of the sending of pulses in the reverse direction, and which are transmitted by the auxiliary or second generator located at the opposite end of the line section, can be effected manually from the auxiliary station itself, by means of a cut-off switch, or remotely, for example, by means of an automatic telephone call or by signals transmitted by radio. With these systems, a suitable relay is simultaneously excited and will provide for the interruption of the connecting line for the pulses from the auxiliary generator.

The present invention is further directed to improvements in the feed or supply system for the individual panels which, instead of depending directly on a local source of alternating current, is, with the necessary modification, derived from a charged buffer battery supplied from the network through a rectifier. This is of great importance for the purpose of avoiding interruptions of even a short duration and affecting even a single station installation, due to an interruption even of short duration, in the supply of energy from the network, because this may cause, in addition, a phase displacement in the operation of the local timing apparatus.

An object of the invention is to provide an improved time centralizing apparatus such as used in railroad installations.

Another object of the invention is to provide such a time centralizing apparatus which eliminates the necessity for the use of a telephone pair.

A further object of the invention is to provide such a time centralizing apparatus in which the circuitry of each station repeating panel is simplified and the reliability of operation of the entire system is greatly increased.

For an understanding of the principles of the invention, reference is made to the following description of a typical embodiment thereof as illustrated in the accompanying drawing.

BRIEF DESCRIPTION OF THE DRAWING

In the drawing,

The single FIGURE is a schematic wiring diagram of a time centralizing apparatus embodying the invention.

DESCRIPTION OF THE PREFERRED EMBODIMENT

In the drawing, a time centralizing apparatus embodying the invention is illustrated as controlling, for example, the synchronization of clocks 23 through a signalling section including a lamp 25, a component 47 and a switching means 51 having contacts 51A and 51B. Reduced to its essential features, the installation comprises a reversing relay 13 and two repeating relays 15 and 17. Operating potential is supplied through supply lines 27 and 45 which, in accordance with the invention, are energized from a buffer battery 50 which is charged, through a rectifier 51, from terminals 52 which may be connected to a suitable source of AC potential such as, for example, the usual lighting circuit. The pulses or timing signals from the main pilot generator, at one end of this line section, arrive over input lines 9A, and the pulses are transmitted to the next succeeding station along the line section over the output lines 9B.

A first time relay 19 and a second time relay 20, which controls energization of reversing relay 13, effects switching from the reversing position to the normal position when the regular sequence of synchronizing pulses arriving from the second or auxiliary generator, over lines 9B, is interrupted or fails to occur. Relay 19 has a single pair of contacts 19A and an exciting winding or coil 19B. Winding 19B has a condenser 41 connected in parallel therewith and a polarizing diode 43 and a resistor 19R connected in series therewith.

Relay 20 has two pairs of contacts 20A and 20C, and an excitation coil or winding 20B. The energizing circuit of winding 20B includes a resistor 20R and a polarizing diode 44 in series, and a condenser 42 in parallel with winding 20B.

The illustrated time centralizing apparatus operates in a manner which will now be described. The components are illustrated in the condition of reversal, where timing or signalizing pulses are being received from the second or auxiliary generator, at the remote end of the line section, over the lines 9B. Relay 19 is deenergized, so that its contacts 19A are closed, and relay 20 is simultaneously energized, with its winding 20B being supplied with current at a uniform value by condenser 42. The latter can recover the charge lost, at the expense of the line 27, through the closing of contacts N–O of energized relay 13, and of the contacts A–B of one of the relays 15 and 17. The latter contacts are closed only during the duration of each synchronization pulse arriving over lines 9B. Under these conditions, contacts 20A of relay 20 are closed and contacts 20C are open, as illustrated in the accompanying drawing. Thus, relay 13 is in the reversing position, as is excitation winding 13A has flowing therethrough current from line 27 through closed contacts 19A and 20A.

In the event of non-arrival of a pulse over line 9B, and hence no resulting excitation of one of the repeating relays 15 and 17, condenser 42 does not regularly receive recharging pulses. After a certain interval of time, slightly greater than the repeat period of the timing pulses, condenser 42 is unable to maintain a sufficient current flowing through the winding 20B of relay 20, so that relay 20 becomes deenergized. The resultant opening of contact 20A interrupts flow of current through winding 13A or relay 13 which latter, thus becoming deenergized, moves back to the normal position, thus presetting rapid recharging of condenser 41 and hence excitation of relay 19. Charging of condenser 41 is effected from line 27, for a first short time period, through closed contacts U–D and 20C, respectively, of relays 13 and 20. Subsequently, charging of condenser 41 is effected through contacts I–H of one of the relays 15 and 17, closed for the duration of each regular synchronization pulse arriving, from the main pilot generator, through restored lines 9A.

Switching of relay 15 back into the normal position, which involves closing of contacts U–D, presets relay 20 for a new excitation. Such new excitation occurs, however, with a suitable delay with respect to the instant of excitation of relay 19, whose condenser 41 is subject to a charge through resistor 19R so much faster than that of condenser 42 of relay 20, which occurs through resistor 20R which has a value about ten times that of resistor 19R.

With the restoration of relay 13 and of micro-relays 9 and 20 to the respective normal positions, the apparatus is able to receive pulses from the main pilot generator. This operation is repeated simultaneously in each other repeat panel, along the line section, which has been effected by the reversal, so that the original operation of the entire section is thus reactivated.

While a specific embodiment of the invention has been shown and described in detail to illustrate the application of the principles of the invention, it will be understood that the invention may be embodied otherwise without departing from such principles.

What is claimed is:

1. In time centralizing apparatus, such as used in railroad installations, of the type including a line section having plural stations each having a repeater panel, a pilot generator at one end of the line section transmitting synchronizing electric pulses to the station nearest thereto, with the repeater panel of each station being adapted to synchronize clocks or other local servo devices and to transmit, to the next succeeding station, the sequence of pulses received thereby, a second generator at the opposite end of the line section operable, responsive to non-arrival of pulses from the pilot generator, to transmit synchronizing electric pulses in the opposite direction along the line section to synchronize the cut-off stations, a respective reversing relay at each repeater panel normally conditioning the associated panel to receipt of pulses from the pilot generator, and respective means at each repeater panel operable, responsive to non-arrival of pulses from the pilot generator, to operate the associated reversing relay to condition the associated repeater panel to receipt of pulses from the second generator: the improvement comprising, in combination, restoring means operable to restore conditions of normalcy to said time centralizing apparatus after the removal of a defect or of any failure, said restoring means providing for restoration of each repeating panel effected by the failure and thus automatically switch to a position of emergency operation; said restoring means comprising a respective time micro-relay at each station operable, responsive to interruption of the regular sequence of timing pulses transmitted in a reverse direction along the line section from said second generator, to switch the associated reversing relay from the emergency condition to the normal condition to condition the associated repeater panel for receipt of synchronizing pulse sequences from said pilot generator.

2. In time centralizing apparatus, the improvement claimed in claim 1, in which said time micro-relay is a delayed relay controlling energization of the exciting winding of the associated reversing relay when the associated relay is in the reversal position; a condenser connected to the exciting winding of said delayed relay and operable, under conditions of reversal, to be periodically charged for the duration of each timing pulse coming from said second generator; the charge on said condenser, when the condenser is not regularly charged due to interruption of the sequence of pulses arriving from said second generator, being insufficient to maintain energization of said delayed relay so that said delayed relay is deenergized and, responsive to such deenergization, the associated reversing relay is transferred to the conditions of normalcy.

3. In time centralizing apparatus, the improvement claimed in claim 2, in which said condenser is charged, during the duration of each such timing pulse arriving from said second generator, from a local power supply line.

4. In time centralizing apparatus, the improvement claimed in claim 1, in which the sequence of timing pulses transmitted in the reverse direction by said second generator is interrupted by manual operation of a switch at the station having said second generator.

5. In time centralizing apparatus, the improvement claimed in claim 1, in which the sequence of timing pulses transmitted in the reverse direction from said second generator is interrupted by operation of a relay, at the station having said second generator, responsive to a signal transmitted from a location remote from the station having said second generator.

6. In time centralizing apparatus, the improvement claimed in claim 1, in which each repeater panel is energized from a local source of operating potential.

7. In time centralizing apparatus, the improvement claimed in claim 6, in which each local source comprises a buffer battery connected to the associated repeater panel and charged from commercial AC mains through a rectifier.

8. In time centralizing apparatus, the improvement claimed in claim 2, in which said means at each repeater panel operable, responsive to non-arrival of pulses from the pilot generator, to operate the associated reversing relay to condition the associated repeater panel to receipt of pulses from said second generator comprises a relay having normally open contacts in series in the energizing circuit of the excitation winding of the associated repeater relay; a second condenser connected in parallel with the excitation winding of said last-named relay and charged by timing pulses of said pilot generator; a respective resistor in the charging circuit of each of said condensers; the resistor in the charging circuit of said first-mentioned condenser having a value which is a multiple of that of the resistor in the charging circuit of said second condenser, whereby said second condenser is charged at a rate much greater than the rate of charge of said first-mentioned condenser.

* * * * *